UNITED STATES PATENT OFFICE.

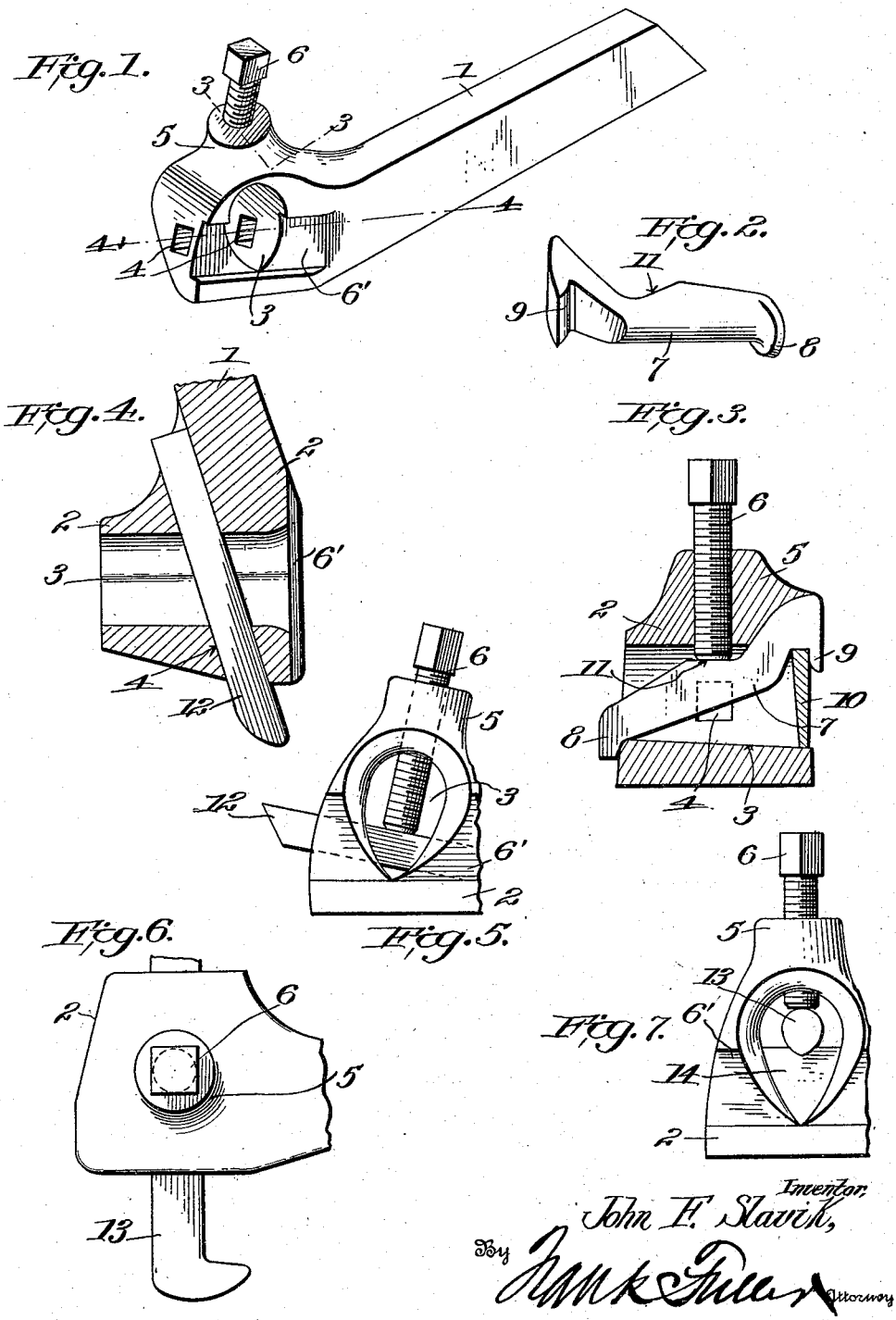

JOHN F. SLAVIK, OF POUGHKEEPSIE, NEW YORK.

TOOL-HOLDER.

1,203,799. Specification of Letters Patent. Patented Nov. 7, 1916.

Application filed March 9, 1916. Serial No. 83,018.

*To all whom it may concern:*

Be it known that I, JOHN F. SLAVIK, a citizen of the United States, residing at Poughkeepsie, in the county of Dutchess and State of New York, have invented certain new and useful Improvements in Tool-Holders, of which the following is a specification.

My invention relates to a lathe, planer, shaper, boring mill or other machine attachment for holding suitable tools.

The main object of the present invention is to provide a holder of the type set forth which will be capable of practically universal use in connection with tools of various sizes and shapes.

At the same time I aim to so construct the tool holder that the tools may be secured to the tool post without removing the tool holder from the tool post and to attain other objects such as will hereinafter appear from the following description taken in connection with accompanying drawings, wherein:—

Figure 1 is a perspective view of the tool holder; Fig. 2 is a perspective view of the dog which may be used in connection therewith; Fig. 3 is a cross sectional view on substantially the line 3—3 of Fig. 1; Fig. 4 is a cross sectional view taken substantially on the line 4—4 of Fig. 1; Fig. 5 is a fragmentary side elevation of the holder containing a roughing tool and Figs. 6 and 7 are respectively fragmentary plan and side elevations of the holder with boring tools therein.

Referring specifically to the drawings, 1 designates a shank adapted to be removably fastened as usual in a tool post of a lathe or other machine which is integral with a tool mounting head 2, relative to which it is disposed at the usual angle.

A tool-retaining recess 3 extends transversely and completely through the head 2 while a tool-retaining recess 4 extends substantially longitudinally of the head at a slight angle and intersects the recess 3. An opening having screw threads thereat is provided in an arch 5 above the recesses 3 and 4 and a set screw 6 disposed at a slight angle to the vertical is mounted in said opening at the point of intersection of the recesses so as to engage a tool mounted in either recess. The bottom of recess 3 is preferably on an angle to accommodate tools of different sizes and shapes, for instance round and hexagonal.

In one side of the head 2, a tool-retaining recess 6' having its top and bottom walls slightly inclined is provided and which crosses the recess 3.

A dog 7 may be used which is by way of example of the type shown in Figs. 2 and 3; it having lugs 8 and 9 respectively to overlap a side of the head 2 and a tool. When a tool like the cutting off tool 10 of Fig. 3 is used, it is placed in recess 6 at a slight angle to the horizontal and dog 7 is then positioned as in Fig. 3 with lug 8 overlapping one side of the head 2 and lug 9 overlapping the tool 10. Thus when the set screw 6 is tightened tool 10 is securely fastened. A flat wall or table 11 is provided on the dog to be engaged by the set screw to properly clamp the dog in position. If a tool like the roughing tool 12 of Figs. 4 and 5 is used, the dog is removed, tool 12 inserted in recess 4 and the set screw 6 tightened thereagainst.

Should a boring tool as shown at 13 in Figs. 6 and 7 be used, the tool is disposed in the recess 3 and the set screw clamped thereagainst. In this instance the tool extends at right angles to the other tools referred to. Also in this instance a tool of small diameter may be used and a removable filler block 14 inserted in the recess 3 and which tool 13 bites at 15.

It will be realized that I have provided a holder in which many different tools may be secured and that hence the article is substantially universal with respect to the different tools it may support. Also most of the tools may be inserted and removed relative to the holder without removing it from the tool post. The tools illustrated are by way of example only and I do not limit myself to the use of any particular tools.

A very important feature is the provision of the intersecting openings with the set screw at the point of intersection.

Having thus described my invention, what I claim is:—

1. A tool holder having a tool-retaining recess, said holder having a second tool-retaining recess, said second tool-retaining recess being enlarged relatively to the first mentioned tool-retaining recess, tool-engaging means for disposition in the second-tool retaining recess, and fastening means common to tools in both of said recesses and said tool-engaging means.

2. A tool holder having a tool-retaining recess, means on the holder intersecting said recess to mount a tool, a dog disposed in said recess to directly engage the tool, and said recess being enlarged to facilitate adjustment of the dog relatively to the tool mounted by the said means.

3. A tool holder having a recess and a recess disposed at an angle to and intersecting said recess, fastening means in the first mentioned recess for a tool therein extending into the second mentioned recess and a clamp means engageable with said fastening means.

4. A tool holder having a recess and a recess disposed at an angle to and intersecting said recess, a dog in the first mentioned recess overlapping the holder to prevent movement of the dog relatively to the holder in one direction and having means to overlap a tool in the second mentioned recess to prevent movement of the dog relatively to the holder in the opposite direction, and a set screw engageable with said dog.

5. A tool holder having a recess and a recess disposed at an angle to said recess and a third recess, a dog within the last mentioned recess, lugs on the dog to overlap the holder and a tool in the third mentioned recess, and a set screw to engage said dog at substantially the point of intersection of the first and second mentioned recesses.

In testimony whereof I affix my signature in the presence of two witnesses.

JOHN F. SLAVIK.

Witnesses:
 CHARLES G. KELLER,
 LIONEL BOOTH.

Copies of this patent may be obtained for five cents each, by addressing the "Commissioner of Patents, Washington, D. C."